(12) United States Patent
Strack et al.

(10) Patent No.: US 10,866,837 B2
(45) Date of Patent: Dec. 15, 2020

(54) DISTRIBUTED JOB FRAMEWORK AND TASK QUEUE

(71) Applicant: LendingClub Corporation, San Francisco, CA (US)

(72) Inventors: Paul Strack, Hayward, CA (US); Srinivasa Ambikapathi, Belmont, CA (US); Abhijit Karpe, Fremont, CA (US)

(73) Assignee: LendingClub Corporation, San Francisco, CA (US)

( * ) Notice: Subject to any disclaimer, the term of this patent is extended or adjusted under 35 U.S.C. 154(b) by 161 days.

(21) Appl. No.: 16/048,513

(22) Filed: Jul. 30, 2018

(65) Prior Publication Data

US 2020/0034203 A1 Jan. 30, 2020

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4881* (2013.01)

(58) Field of Classification Search
CPC ............................ G06F 9/5038; G06F 9/4881
See application file for complete search history.

(56) References Cited

U.S. PATENT DOCUMENTS

| 5,602,988 | A | * | 2/1997 | Haulin | ................... | G11C 29/74 714/42 |
| 5,835,748 | A | * | 11/1998 | Orenstein | ........... | G06F 9/30014 712/217 |
| 6,927,770 | B2 | | 8/2005 | Ording | | |
| 2005/0022173 | A1 | * | 1/2005 | Kanade | ................. | G06F 9/4881 717/140 |
| 2008/0021987 | A1 | | 1/2008 | Bates et al. | | |
| 2012/0096468 | A1 | * | 4/2012 | Chakravorty | ............. | G06F 9/50 718/103 |
| 2018/0083825 | A1 | * | 3/2018 | Prabhakara | ........... | H04L 41/065 |

OTHER PUBLICATIONS

Strack, U.S. Appl. No. 16/048,514, filed Jul. 30, 2018, Notice of Allowance, dated Feb. 7, 2020.

* cited by examiner

*Primary Examiner* — Camquy Truong
(74) *Attorney, Agent, or Firm* — Hickman Palermo Becker Bingham LLP; Shane T. Lunceford (57) ABSTRACT

A queue-based task management system is provided. Unlike conventional queue-based task management systems, the system described herein does not handle all tasks in the conventional manner. Rather, tasks can be associated with one of several modes, including: a queue-mode (always storing the task in the queue) and an immediate-mode (record the task, but execute it immediately if possible). The two modes may be controlled programmatically to optimize utilization of system resources. Immediate-mode is implemented by monitoring available task system resources, and executing the task immediately in-process if there are resources available; otherwise the task is delegated to the queue. This in-process execution allows the sharing of parent task resources.

20 Claims, 5 Drawing Sheets

DISTRIBUTED JOB FRAMEWORK AND TASK QUEUE

FIELD OF THE INVENTION

The present invention relates to task management within a computer system.

BACKGROUND

Task management often involves dividing a large task that is to be performed by a computer system into smaller tasks, and then scheduling execution of those smaller tasks. Traditional task management systems often turn each task into a "message", and then use a message queue to hold the messages until the processing resources become available. When processing resources become available, the task represented by the message that is currently at the head of the message queue is performed.

Message queues solve task resiliency problems, but it is very difficult to manipulate messages after they enter the queue. For example, once the messages are added to the message queue, the corresponding tasks are performed in a sequence that is based on the queue order. Consequently, runtime tracking and manipulation of jobs collectively (for example, reprioritizing all tasks) is nearly impossible.

In queue-based job management systems, inefficiency arises when entries for a set of homogeneous tasks (e.g. tasks requiring similar resources) are clumped together in the queue. For example, assume that a particular job requires the generation of a thousand contracts, and that each of the thousand contracts has to be converted to a particular format, and then watermarked. The tasks of converting the contracts to a particular format may require a document-conversion service, while the watermarking may require a watermarking service. If records for all thousand conversion tasks are clumped together in the task queue, then the document-conversion service may become overloaded when those tasks reach the head of the queue and start being executed. Similarly, if records for all thousand watermarking tasks follow the records for the conversion tasks in the task queue, the watermarking service may become overloaded when those watermarking tasks reach the head of the queue and start being executed. It would be much more efficient if the conversion-task records and the watermarking-task records were interleaved within the task queue.

Some job management systems use a workflow approach to job decomposition. Workflows can be overly rigid, reacting poorly when the set of tasks in the workflow are highly variable. Workflows are also difficult to adjust at runtime.

In light of the foregoing, it is desirable to provide a job management system that allows greater flexibility and results in greater efficiency than conventional message queue and/or workflow-based job management systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A queue-based task management system is provided. Similar to conventional queue-based task management systems, records that correspond to tasks are placed in the tail of the queue. When resources become available, the task that corresponds to the record at the head of the queue is executed. A task is considered to be in the task queue when a record for the task is in the task queue.

Typically, to execute an instance of a particular type of job, a queue-based task management system (a) determines which actions need to be performed to accomplish the job instance and (b) creates a task for each individual action. Tasks may themselves create subtasks for more complex processes (for example, a loan issuance job may have a new task for each stage of the loan issuance process). According to one embodiment, task creation is programmatic. Creating subtasks is entirely the responsibility of individual jobs and tasks and can be completely dynamic. Consequently, there is no need to have a globally preconfigured workflow for the task process. In one embodiment, task chains are connected to each other using identifiers. Thus, stored with a child task may be an identifier both of the parent task that created it, and an identifier of the entire job instance to which the child task belongs. For example, in one embodiment, the record for each task includes a reference to the job ID of the job instance to which the task belongs, and the parent ID of the parent task that created the task.

Unlike conventional queue-based task management systems, the system described herein does not handle all tasks in the conventional manner. Rather, tasks can be associated with one of several modes, including: a queue-mode (always storing the task in the queue) and an immediate-mode (record the task, but execute it immediately if possible). These two modes facilitate performance optimizations not normally possible with a queuing system. For example, if a task can be executed immediately, it may share the task data or system resource of its parent task to reduce the overall load on the system. The two modes may be controlled programmatically to optimize utilization of system resources. Immediate-mode is implemented by monitoring available task system resources, and executing the task immediately in-process if there are resources available;

otherwise the task is delegated to the queue. This in-process execution allows the sharing of parent task resources.

Immediate-Mode Tasks

As mentioned above, the job management techniques described herein allow some tasks may be designated as "immediate-mode" tasks. Rather than place a record for an immediate-mode task in the tail of the task queue, an immediate-mode task is immediately executed, ahead of all tasks in the task queue, as long as resources are available to immediately execute the immediate-mode task. Only when resources are not available to immediately execute the immediate-mode task is a record for the immediate-mode task placed in the queue.

A task may qualify as an immediate-mode task in a variety of ways. In one embodiment, a user may explicitly designate a task to be an immediate-mode task. For example, a user may be up against a deadline for completing a particular job. To give preference to that particular job, the user may explicitly designate the tasks of the job to be immediate-mode tasks.

As another example, a task may qualify as an immediate-mode task by virtue of one or more characteristics of the task. For example, in one embodiment, all tasks that are not top-level tasks qualify as immediate-mode tasks. Tasks that are not top-level tasks are tasks that are created by other tasks. If a first task creates a second task, the first task is referred to as the "parent" of the second task, and the second task is referred to as the "child" of the first task.

By treating all child tasks as immediate-mode tasks, the likelihood that such tasks can be executed using the same resources as the parent task (e.g. executed as part of the same process) is increased. For example, assume that task A creates child task B. If child task B is placed in the tail of the task queue, it is likely that the resources allocated to task A will have been deallocated by the time child task B reaches the head of the task queue and is executed. On the other hand, if child task B is treated as an immediate-mode task, child task B will be executed (if resources are available) immediately after created by parent task A. Because parent task A just created child task B, parent task A is probably still executing when child task B is executed. Consequently, child task B can make use of the same resources (e.g. execute in the same process) as its parent task A.

Job Management System with Support for Immediate-Mode Tasks

Figure 1:
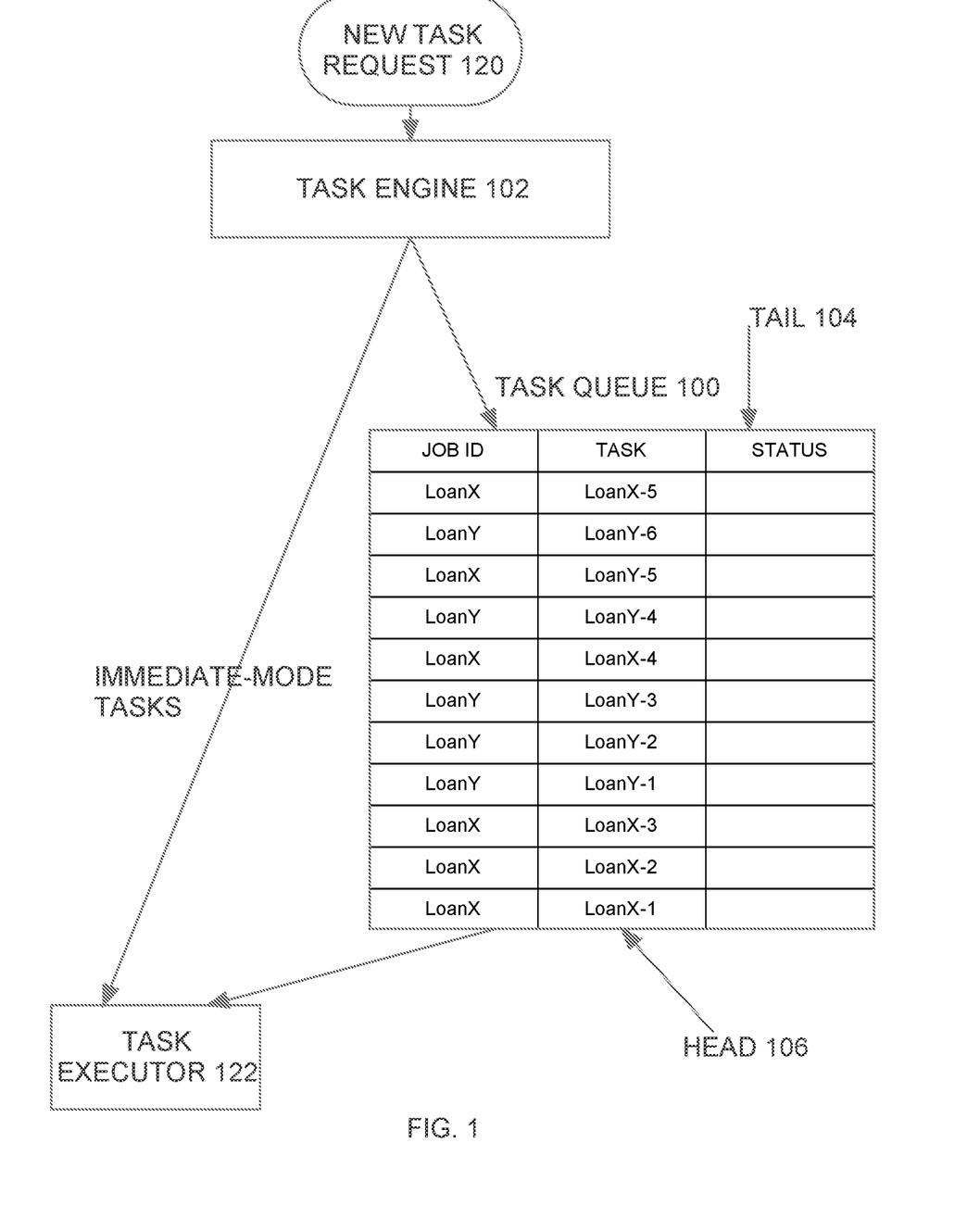
FIG. 1 is a block diagram of a queue-based job management system, according to an embodiment.

FIG. 1 is a block diagram of a job management system with support for immediate-mode tasks, according to an embodiment. In the illustrated embodiment, the distributed job and task queue system functions by storing tasks in a database task queue (task queue 100) that can be manipulated at runtime. A task engine 102 stores newly created tasks in task queue 100, and periodically looks for new tasks to perform. Task creation and execution are distributed across multiple system nodes. The system nodes that participate in execution of the tasks are collectively represented by task executor 122.

As used herein, a "job" refers to a collection of tasks that perform a function. The function performed by the tasks varies based on the type of job involved. For example, a "loan creation" job may create all of the documents required to execute a particular loan, and a "loan payment" job may cause funds from one account to be distributed to one or more other accounts.

A single execution of a particular type of job is referred to herein as a "job instance". According to one embodiment, each job instance is assigned a distinct job ID. For example, a type of job may be "loan creation", and a first execution of the "loan creation" job for a batch of loans ("loan batch X") may associated with the job ID "LoanX", while a second execution of the "loan creation" job for another batch of loans ("loan batch Y") may be associated with the job ID "LoanY".

Referring to FIG. 1, it illustrates a scenario in which task queue 100 has tasks for two job instances: the creation of loan batch X (with job ID "LoanX"), and the creation of loan batch Y (with job ID "LoanY"). In the example illustrated in FIG. 1, task queue 100 has records (labelled LoanX-1 to LoanX-5) for five tasks associated with job LoanX, and records (labelled LoanY-1 to LoanY-6) for six tasks associated with job LoanY.

As mentioned above, the job management system illustrated in FIG. 1 includes support for immediate-mode tasks. For any given new task request 120, task engine 102 determines whether the requested task is an immediate-mode task. If the requested task is an intermediate-mode task and resources are currently available to execute the requested task, then the task is executed by task executor 122 ahead of all tasks currently in the task queue 100, rather than being placed at the tail 104 of task queue 100. In one embodiment, task engine 102 may cause an immediate-mode task to be executed immediately by task executor 122 by placing the record for the immediate-mode task at the head 106 of the task queue 100, rather than the tail 104.

If the new task request 120 is not an immediate-mode task or if the resources required to execute the task are not available, then task engine 102 adds a record for the task to the tail 104 of the task queue 100.

Treating Child Tasks as Immediate-Mode Tasks

As mentioned above, jobs comprise a set of tasks, each of which may create child tasks, which themselves may create child tasks. The highest-level tasks of a job are not the children of other tasks. Those highest-level tasks are referred to herein as "top-level" tasks. In one embodiment, task engine 102 determines whether a task qualifies as an immediate-mode task based on whether the task is a top-level task or a child task. Top-level tasks are executed in queue-mode, while child tasks are executed in immediate mode.

For the purpose of illustration, assume that a loan application job involves:
 processing agreements for 10 loans
 generating 5 agreements for each of these loans (50 total)
 converting each agreements to a particular target format (e.g. .pdf) (50 total)
 watermarking each of the converted agreements (50 total)

Under these conditions, the job instance to create the application for loan job X may actually require execution of 155 one distinct tasks: 10 top-level task for each loan to initiate the creation of 5 agreements for that loan, and three child tasks (generate, convert, watermark) for agreement, for 150 total. For the purpose of illustration, the top-level tasks for the loan application job LoanX shall be referred to as tasks LoanX-1 to LoanX-10. The child tasks to generate the agreements for LoanX shall be referred to as tasks LoanX-1.1-generate to LoanX-1.5-generate for the first loan, up through LoanX-10.1-generate to LoanX-10.5-generate for the tenth and final loan. Similarly, the child tasks to convert the agreements for LoanX shall be referred to as tasks LoanX-1.1-convert to LoanX-10.5-convert. The child tasks to watermark the agreements for LoanX shall be referred to as tasks LoanX-1.1-watermark to LoanX-10.5-watermark.

At the time illustrated in FIG. 1, records for the first five top-level tasks for loan job X have been placed in task queue 100, and records for the first six top-level tasks for loan job Y have been placed in task queue 100. Because the top-level tasks did not qualify as immediate-mode tasks, records for the top-level tasks were added to the tail 104 of task queue 100.

The record for the LoanX-1 task is at the head 106 of task queue 100. Consequently, when resources are available, task executor 122 executes the LoanX-1 task. During execution, the LoanX-1 task requests execution of the five LoanX-1.1-generate through LoanX-1.5-generate tasks. Task engine 102 determines that LoanX-1.1-generate is a child task, and therefore automatically qualifies as an immediate-mode task. Assuming that resources are available, task engine 102 causes task executor 122 to immediately execute the LoanX-1.1-generate task.

Since the parent of the LoanX-1.1-generate task (LoanX-1) just requested the performance of the LoanX-1-generate task, it is likely that the same resources that were allocated to the parent task (LoanX-1) are available for use in executing the child task LoanX-1-generate. Thus, treating child tasks as immediate-mode tasks significantly increases the chances that child tasks will be executed using the same already-allocated resources that were used to execute their respective parent tasks.

At some point, the LoanX-1.1-generate task will request execution of the LoanX-1.1-convert task. The LoanX-1.1-convert task is a child task, and will therefore qualify for immediate-mode execution. Since the parent of the LoanX-1.1-convert task (LoanX-1.1-generate) just requested the performance of the LoanX-1.1-convert task, it is likely that the same resources that were allocated to the parent task are available for use in executing the child task LoanX-1.1-convert.

At some point, the LoanX-1.1-convert task will request execution of the LoanX-1.1-watermark task. The LoanX-1.1-watermark task is a child task, and therefore qualifies for immediate-mode execution. Since the parent of the LoanX-1.1-watermark task (LoanX-1.1-convert) just requested the performance of the LoanX-1.1-watermark task, it is likely that the same resources that were allocated to the parent task are available for use in executing the child task LoanX-1.1-watermark.

Executing child tasks as immediate-mode tasks yields several benefits. For example, it is more efficient to execute child tasks using the resources initially allocated to their parent tasks than to deallocate the resources of the parent tasks and then, at a later time, allocate resources for the child tasks from scratch. In addition, executing child tasks in immediate node tends to break up the clusters of similar tasks. For example, if child tasks of job LoanX-1 were added to the tail 104 of task queue 100 in the conventional manner, it is possible that all 50 agreement generation tasks of job LoanX (clumped together in queue 100) would be executed during a first time period, then all 50 conversion tasks of job LoanX (clumped together in queue 100) would be executed in a second time period, and then all 50 watermarking tasks (clumped together in queue 100) would be executed during a third time period. During each of those three time periods, a small number of services would doing all the work (e.g. during the second time period the conversion service would be overburdened, while the agreement-creation and watermarking services are idle). It is much more efficient to have the tasks that are being performed at any given time spread among several heterogeneous services so that no services become overburdened while other services are idle.

Example Task-Handling Techniques

Figure 2:
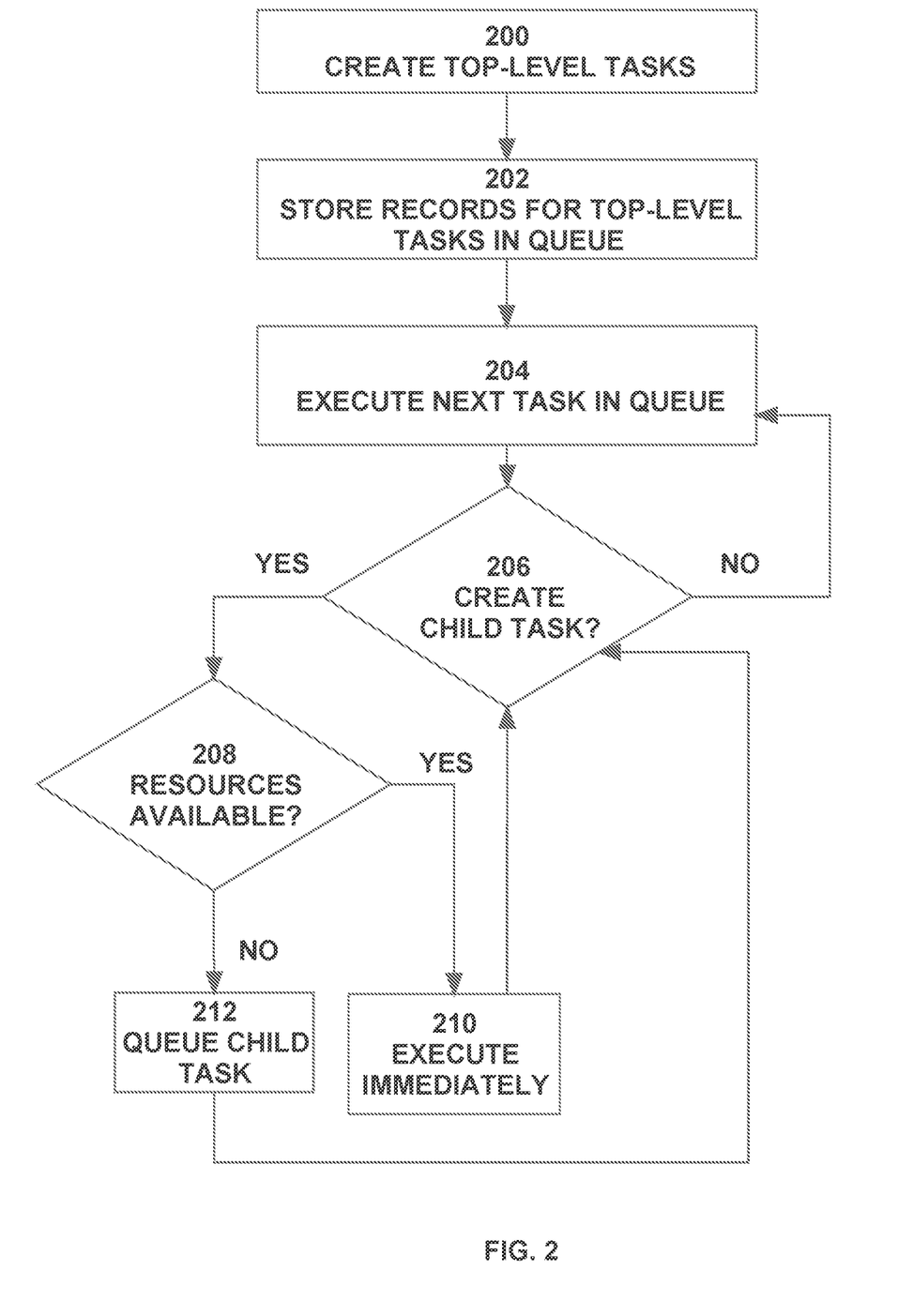
FIG. 2 is a flowchart illustrating how tasks are handled, according to an embodiment.

FIG. 2 is a flowchart that illustrates task-handling techniques, according to an embodiment in which top-level tasks are queued and child tasks are treated as immediate-mode tasks. Referring to FIG. 2, at step 200 the top-level tasks of a particular job instance are created. At step 202, those top-level tasks are handled as queue-mode tasks by adding a record for each of the top-level tasks to the tail of the job queue.

At step 204, the system executes the next task in the queue. The next task in the queue is the task whose record resided at the head of the queue. Initially, that task will be a top-level task. During execution of that task, the task may create a child task (step 206). If the task creates a child task, the child task is treated as an immediate mode task and control proceeds from step 206 to step 208. At step 208, the system determines whether resources are available for executing the child task. If resources are available, then at step 210 the child task is immediately executed, preferably using the same resources that were allocated to its parent.

As long as child tasks are being created, either by the top-level task or by its descendants, control continues to loop back to step 206, and each child task created is either executed immediately (step 210) or queued (step 212) when resources are not available for immediate execution.

When the first top-level task has finished execution and all of its descendants have either been immediately executed or queued, control returns to step 204 and the task that is currently at the head of the task queue is executed.

In the description of FIG. 2 given above, it was assumed that a single task is being executed at any given time. However, in most systems, many tasks can be executed concurrently. Thus, at any given time, several tasks can be pulled from the head of the queue and executed concurrently. Each of those tasks may create any number of child tasks. Thus, the child tasks of one top-level task may be executing concurrently with the child tasks of any number of other top-level tasks, from the same job instance or from other job instances.

Other Task Execution Modes

According to one embodiment, in addition to queue mode and immediate mode, the job management system supports a "no queue mode" and a "delay mode". No queue mode is similar to immediate mode in that a no queue mode task is executed immediately, rather place in a queue, if resources are available. However, unlike immediate mode, a no queue mode task is never placed at the tale of the queue when resources are not available. Instead, if no resources are available, a no queue mode task is executed as soon as resources become available. Thus, no queue mode may be used for tasks that should always be given priority over other types of tasks.

A delay mode task is immediately placed at the tail of the task queue. However, when the delay mode task is at the head of the task queue, the task is only executed if a specified amount of time has elapsed since the task was created. If the specified amount of time has not lapsed and the system is ready to execute a new task, then the system skips the delay mode task and executes the next task in the task queue. Once the specified amount of time has lapsed, the delay mode task becomes eligible for execution as if it had been inserted into the queue at the point in time to which it had been delayed.

If a delay mode task is inserted into the queue at 10:00 AM with a delay of 5 minutes, it will not execute until at least 10:05 AM, and after that time its execution order is determined as if it had been inserted into the queue at 10:05 AM. In particular, it will be executed after tasks queued at 10:04 AM but before tasks queued at 10:06 AM.

Execution Pools

As explained above, the execution sequence of tasks takes into account on the execution mode of the tasks and the position of the tasks within the task queue. According to one embodiment, how and when a task is executed are also affected by the priority level that is assigned to the task.

According to one embodiment, to account for tasks with different priority levels, multiple task execution pools are maintained. Each task execution pool may have its own task queue, and support the various task execution modes described above.

For example, in a system with two task execution pools, low-priority tasks may be processed in a low-priority execution pool, while high-priority tasks are processed in a high-priority pool. To ensure that the high-priority tasks are treated more favorably than the low-priority tasks, more system resources can be used for executing the tasks in the task queue of the high-priority execution pool. For example, 75% of the execution threads available in the system may be dedicated to execution of the tasks in the task queue of the high-priority execution pool, while only 25% of the execution threads are used for the tasks in the task queue of the low-priority execution pool. As another example, low-priority tasks may be executed in the high-priority execution pool when those resources would otherwise be idle, or in less-busy times of the day.

The amount of resources assigned to each execution pool may change dynamically based, for example, on the priority of the tasks that are being executed. For example, among the tasks assigned to the high priority execution pool, there may by "high priority" tasks and "super priority" tasks. When the high priority execution pool only contains high priority tasks, 75% of the system resources may be dedicated to the high priority pool. However, if any super priority task is encountered, that percentage may be increased automatically to 90% or even 100% of the system resources.

Task Retry Operations

According to one embodiment, tasks that fail are retried. However, during the retry operation, the properties associated with the task are automatically adjusted. For example, a queue mode task that fails may be retried as a delay mode task, where the amount of the delay is set to allow whatever system conditions that caused the initial failure to be resolved.

As another example, the priority of the failed operation may be automatically increased when the task is retried. Such a priority increase may, for example, cause a task that failed when executed with the limited resources available to the low-priority execution pool to be retried with the increased resources available to the high-priority execution pool. As another example, during a retry operation of a failed queue mode task, the execution mode of the task may be automatically changed to immediate mode, thereby allowing the retried task to cut to the front of the appropriate task queue.

Dynamic Manipulation of Unfinished Tasks

In the embodiment illustrated in FIG. 1, the records in task queue 100 include a status column. The current state of each task in task queue 100 is indicated by the task status value in the task status column of the record that corresponds to the task. In one embodiment, any unfinished tasks in the task queue 100 can still be manipulated (e.g. canceled or reprioritized). Such status changes can be made either individually, or for an entire job, by modifying the status and priority indicated in the records that correspond to the relevant tasks.

The system allows tasks to be prioritized, both at the task level and job level. Jobs may be assigned a priority, which becomes the default priority of all tasks created within the scope of the job, either directly or indirectly. This allows "high priority" jobs to have preferred access to system resources so that they can finish more quickly, but allow "low priority" jobs to run in the background and to complete eventually when the system is free of higher priority activity. In one embodiment, the system manages the distribution between high priority and low priority task processing via two processing channels: the "priority channel" (which considers task priority) and the "background channel" (which considers only the order of task creation). The volume of tasks that flow through each channel is adjustable at runtime. Task priorities can also be dynamically adjusted to increase (or decrease) the speed with which they are executed.

Within a single channel/execution pool, tasks may have different priorities. For example, if the system has priority 1, 5 and 10 tasks, then within the priority channel will process all priority 10 tasks before any priority 1 and 5 tasks, but these lower priority tasks may still execute occasionally within the background channel. If all the priority 10 tasks are finished, then the remaining priority 5 tasks will be processed in the priority channel, while the priority 1 tasks will run in the background. If the only remaining unfinished tasks are priority 1, then those tasks will be processed in both the priority and the background channels.

Different task types can be throttled so that resource-intensive tasks can be limited to (a) run only at certain times of day or (b) a reduced the number of concurrent task executions. This prevent such resource-intensive tasks from overwhelming the system. These throttling rules can be dynamically adjusted at runtime based on current system utilization. For example, this can be used to ensure very-low-priority tasks are executed only at night when the system would otherwise be idle.

Job and task parameters and configurations can be modified at runtime. Unfinished tasks can be canceled or reprioritized to adjust the speed at which they are processed. Throttling rules, channel sizes and task processing behavior can also be adjusted at runtime. This runtime reconfiguration allows the system to respond to changing conditions, either automatically or through human intervention (for example by a support team).

There are different events associated with tasks and job state changes that can be monitored for various purposes. Event monitoring can be used to create additional tasks or processing logic when certain events occur. These events can also be used to automatically respond to changing system conditions, for example by adjusting the priority of critical jobs that are taking too long, or even triggering the deploy of additional server nodes to increase the overall system processing power to respond to system problems.

Generating Accurate Predictive Analytics

Jobs take time to complete. How much time any given job instance takes to complete is affected by many factors, including the type and number of tasks required by the job, the type of resources required by those tasks, the quantity of those resources that exist in the system, and the current demands placed on those resources by other job instances. For example, a job type X may normally execute much faster than a job type Y, but a job type X that is executed by a system with fewer resources, or during a period where there is high contention for the resources, may execute slower than a job type Y in a more powerful or less busy system.

It is a common requirement to be able to predict when jobs are going to finish. Thus, it is common for systems to provide a "status bar" that is repeatedly updated to show the approximate ratio between the portion of a job that has been completed and the portion of the job that is not completed. In more sophisticated systems, such status bars may be supplemented with or replaced by predictions of how much time remains before a task is completed.

Unfortunately, such predictions are not always very accurate. In particular, it is difficult to generate accurate predictions before all tasks required by a job instance have even been created. Specifically, until all tasks required by a job instance have been created, the number of "currently-pending" tasks for the job instance does not accurately reflect the remaining work of the job instance. In a system in which any given task can create any number of child tasks, which themselves can create any number of child tasks, the accurate prediction of time remaining until job completion is particularly difficult.

Historical information may be used to predict the amount of time that remains in a pending job instance. For example, if job type X took an average of 20 minutes to complete the last time several times job type X was performed, and a particular instance of job type X was started 10 minutes ago, it can be predicted that the particular instance of job type X will finish in 10 minutes. Unfortunately, predicting time remaining for a particular instance of a job type based on past executions of the job type does not take into account the current state of the system. If the current state of the system is significantly different than the state of the system during the prior executions, any predictions based on those prior executions may be way off. In addition, predictions based on prior executions only work if there exists statistics for a representative sample of prior executions. The first time an instance of a particular job type is executed, no such statistics exist. Therefore, no prediction based on such statistics is possible.

According to one embodiment, rather than predict time remaining based on prior executions, time remaining is predicted based on what has happened so far in the current execution. In order to generate predictions for a currently-executing job instance based on statistics about the currently-executing job instance, the system tracks, for each monitored job instance: (a) how many completed-tasks are currently associated with the job instance, and (b) how many created-but-not-completed tasks are associated with the job instance, and then predicts (c) how many not-yet-created tasks the job instance is likely to have.

Predicting the Number of not-Yet-Created Tasks

In an embodiment where child tasks qualify as immediate-mode tasks, it is common for all top-level tasks of a job to be in the task queue long before the job is complete. Further, because child tasks qualify as immediate-mode tasks, all tasks that are created, directly or indirectly, by the first top-level task may "cut in front of" the later top-level tasks that belong to the same job instance. For example, the first top-level task of job instance LoanX is LoanX-1. The tasks that are created directly or indirectly from LoanX-1 may cut in front of the other top-level tasks of job instance LoanX. Thus, LoanX-1-generate, LoanX-1-convert and LoanX-1-watermark may cut in front of and complete execution before the later top-level tasks (LoanX-2 to LoanX-10) of job instance LoanX.

Because the descendants of a top-level task of a job may cut in front of later top-level tasks of the same job, it is possible for earlier top-level tasks (along with their associated child tasks) in a job to complete execution before other top-level tasks of the same job. According to one embodiment, the performance statistics of earlier top-level tasks of a job may be used to predict the performance of later top-level tasks of the same job, and therefore provide accurate estimates of the time remaining for the job instance to complete.

For example, LoanX-1 is the first top-level task of job LoanX in task queue 100. As explained above, LoanX-1 may create 3 child tasks (LoanX-1-generate, LoanX-1-convert, LoanX-1-watermark). LoanX-1 and its 3 child tasks may be completed before the top-level task LoanX-2 finishes execution. Thus, at the time LoanX-1 completes execution, LoanX-2 may not have created all of its child tasks. In fact, LoanX-1 and its 3 child tasks may be completed before LoanX-2 even starts execution, in which case LoanX-2 will not have created any of its 3 child tasks. However, based on the fact that LoanX-1 created 3 child tasks, it can be predicted that LoanX-2 will do the same. In addition, the amount of time it will take to finish execution of LoanX-2 may be predicted based on (a) how long it took to execute LoanX-1 and its 3 child tasks, and (b) how many of LoanX-2's child tasks have already been executed.

For example, assume:
LoanX-1 and its 3 child tasks have completed execution
3 child tasks of LoanX-2 have been created, and 2 have completed
no child tasks of LoanX-3 to LoanX-10 have been created yet Based on the fact that LoanX-1 has 3 child tasks, it may be assumed that the other top-level tasks will each have 3 child tasks. If each top-level task will have 3 child tasks, then a total of 30 child tasks must be executed to complete job instance LoanX. Of those 30 tasks, five tasks have been executed, so $\frac{1}{6}^{th}$ of job instance LoanX has completed, leaving $\frac{5}{6}$ths to be executed. Based on how long it took to execute that $\frac{1}{6}$th, it can be estimated how long it will take to execute the remaining $\frac{5}{6}$ths.

Not all tasks required by job are the same. For example, watermarking an agreement may take more time than converting the agreement to a target format. Further, even when two tasks are performing similar functions (e.g. two tasks watermarking two different agreements), the amount of time required by the two tasks may differ. However, for the purpose of predicting the amount of time remaining on a partially-executed job, the overall estimate may be sufficiently accurate as long as the average time of all the tasks that have completed is close to the average time of all tasks that have not yet completed, and that different task types are heterogeneously distributed within the entire run of a job.

This tracking mechanism allows predictive analytics on job execution time, so that the system can estimate how much more time is required for the entire job to complete. Significantly, these analytics are based on system current conditions rather than historical behavior, increasing their accuracy. These analytics can remain accurate even if the number of child tasks created by each top-level task is variable, provided that the variation is randomly distributed among all the top-level tasks.

Factors for Determining Total Runtime

According to one embodiment, the status field in the record of a task is used to indicate whether the task is "submitted" or "complete". Since new tasks can be dynamically added to a job instance, the number of submitted tasks of the job instance can increase over time and some tasks may complete before all tasks are submitted. The system distinguishes between parent tasks and child tasks, and tracks the current runtime of each job instance.

Figure 3:
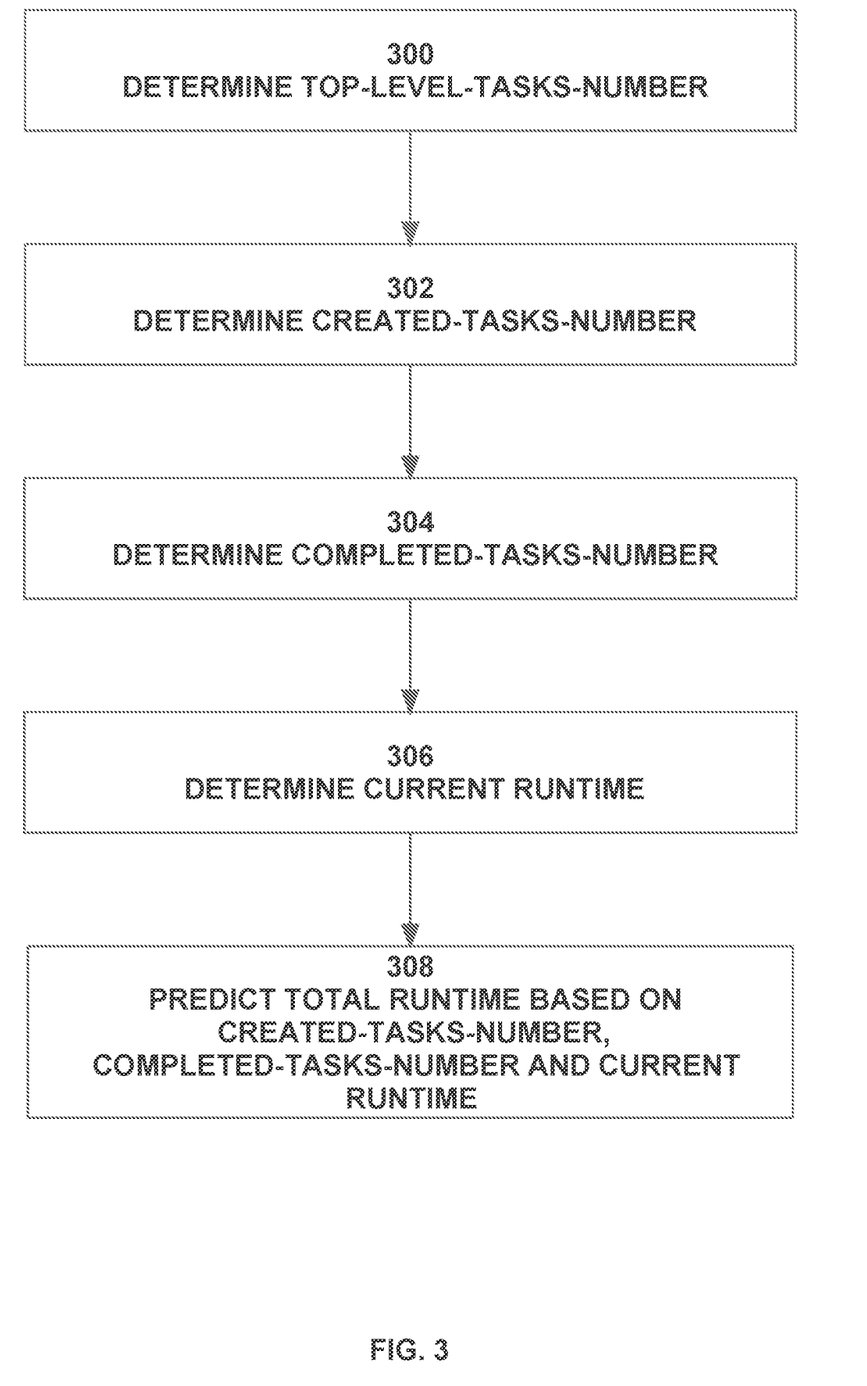
FIG. 3 is a flowchart illustrating how total runtime of a task may be predicted based on current system conditions, according to an embodiment.
Figure 4:
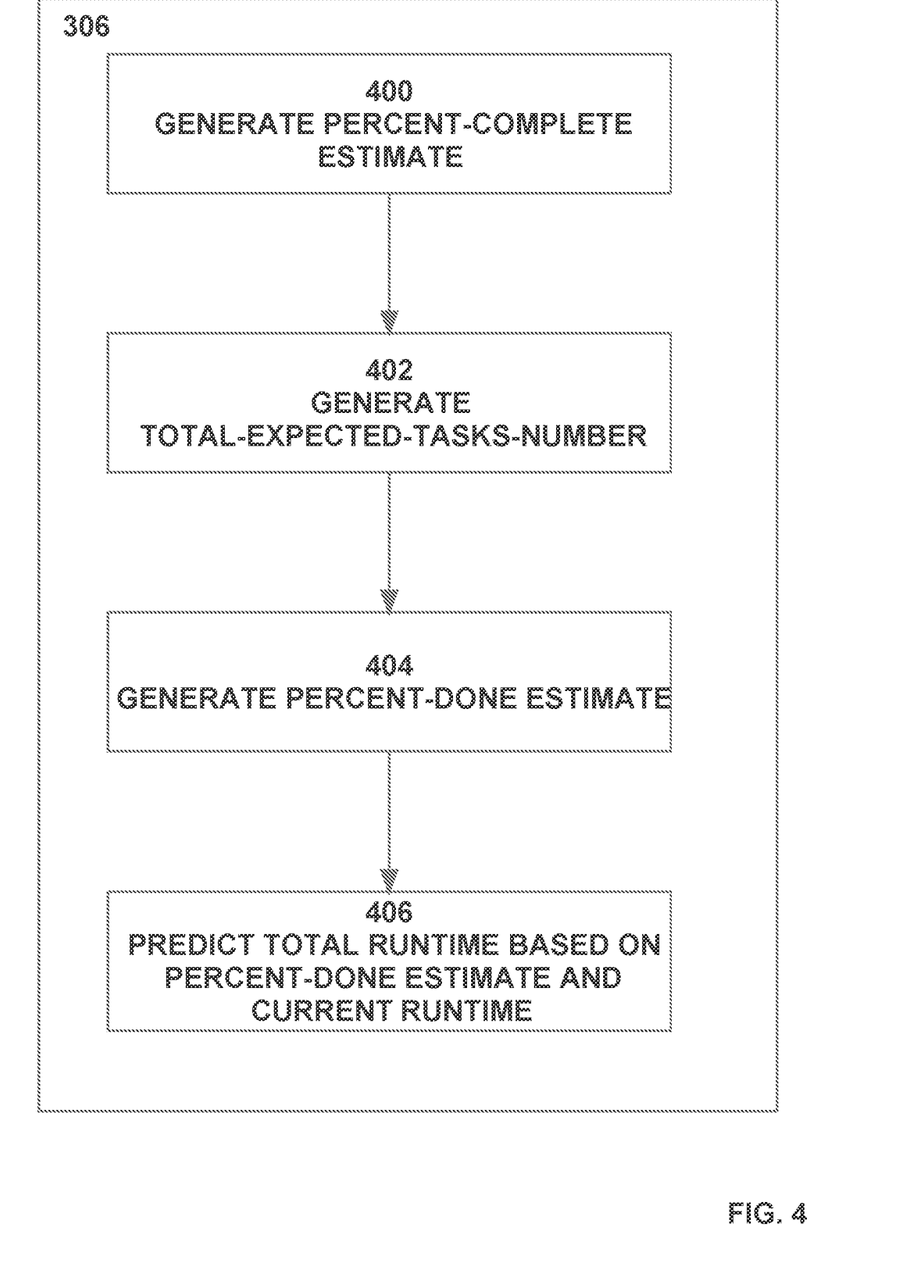
FIG. 4 is a flowchart illustrating how total runtime may be predicted based on a created-tasks-number, completed-tasks-number, and current runtime of a job, according to an embodiment.

FIGS. 3 and 4 are flowcharts illustrating how the total runtime of a job instance may be predicted based on information gathered about execution of the job instance itself, according to an embodiment. While a job instance is executing, the system keeps track of:
top-level-tasks-number (the number of top-level tasks create by the job)
created-tasks-number (the total number of tasks created, including child tasks)
completed-tasks-number (the number of tasks have been completed for the job instance)
the current runtime of the job instance These numbers increase over time as execution of the job instance progresses. These four values correspond to steps 300, 302, 304 and 306, respectively in the flowchart of FIG. 3. As illustrated in step 308, the total runtime of the job instances is predicted based, at least in part, on these three values. Once the total runtime of the job instance is determined, the time remaining, and the predicted time of completion, can be readily determined based on the current runtime and job start time, respectively.

Predicting Total Runtime Based on a Percent-Complete Estimate

FIG. 4 is a flowchart illustrating how the system uses these values to predict total runtime of the job instance, according to an embodiment. Referring to FIG. 4, at step 400 a percent-complete estimate is generated. In one embodiment, to generate the percent-complete estimate, the system keeps track of the number of top-level tasks that have been created for the job instance (the "top-level-tasks-number"). Typically, the top-level-tasks-number of a job instance will remain constant during execution of the job instance. Based on the top-level-tasks-number, a rough "percent-complete estimate" may be calculated according to the formula:

percent-complete estimate=sum(completed-top-levels)/sum(submitted-top-levels)

In step 402, a total-expected-tasks-number is generated. The total-expected-tasks-number is a prediction of how many tasks the job instance will ultimately create. The number of tasks the job instance will ultimately create must take into account the fact that the tasks that have been created for the job instance may cause the creation of an unknown number of not-yet-created child tasks.

For the purpose of explaining how the total-expected-tasks-number may be generated, it shall be assumed that:

All 10 top-level tasks for LoanX have been added to task queue 100.
The first top-level task, LoanX-1, and its three child tasks have been completed
The second top-level task, LoanX-2, is completed and added 3 child tasks to queue 100
Only two of LoanX-2, have completed yet
No child tasks for the remaining top-level tasks of LoanX have been submitted to task engine 102.

In this case, the job currently has 16 created tasks (10 top-level, 6 child tasks), 7 completed tasks (2 top-level, 5 child tasks) and 8 incomplete tasks (8 top-level, 1 child task). Simply comparing created versus complete tasks gives an inaccurate job completion percentage (7/15=46.7%).

As used herein, the term "created-tasks-number" refers to the total number of tasks that have been created so far for the job instance in question. In the present example, the created-tasks-number is 16, which includes the 10 top-level tasks, the 6 child tasks of LoanX-1 and LoanX-2.

Once the created-tasks-number is determined, a "subtasks-created-number" can then be computed according to the formula:

subtasks-created-number=created-tasks-number top-level-tasks-number

In the present example, the created-tasks-number is 16 and the top-level-tasks-number is 10. Consequently, the subtasks-created-number is 6.

Once the subtasks-created-number is known, the number of total-expected-subtasks (subtasks that have not yet been created) can then be computed according to the formula:

total-expected-subtasks-number=subtasks-created-number/percent finished

In the present example, total-expected-subtasks equals 6/0.2, which equals 30. Once the number of total-expected-subtasks has been determined, it is possible to estimate the total number of tasks required by the job as follows:

total-expected-tasks=total-expected-subtasks+top-level-tasks-number

In the present example, total-expected-tasks=30 total-expected-subtasks+10 top-level tasks. Thus, it is expected that 40 total tasks will be required to execute the LoanX job. Once the number of total-expected-tasks has been determined, the percentage done may be calculated (step 404) by:

percent done=sum(complete)/(total-expected-tasks)

In the present example, sum(complete) is 7. Consequently, a more accurate estimate of the percent done is 7/40=0.175 or 17.5%. Once the "percent done" has been determined, the total amount of time to perform the job, given the current conditions of the system, can be calculated (step 406) as:

estimated runtime=current runtime/percent done

In the present example, assume that the job LoanX started at 3:00 PM and the estimated runtime is being determined at 3:02 PM. In this scenario, the runtime is 2 minutes, and the estimated runtime would be 2/0.175=11.43 minutes (11 minutes 26 seconds). Finally, after estimating the total runtime, the estimated end time may be calculated as:

estimated end time=job start time+estimated runtime

In the present example, the estimated end time would be 3:00 PM+11 minutes 26 seconds=3:11:26 PM.

The queue/immediate-mode behavior of the task system interacts intelligently with the predictive analytics by more evenly distributing heterogeneous task types throughout a job's execution. This both smooths out the job's execution and makes predictive analytics more accurate, as well as better managing system resource utilization by intermixing different task types rather than executing everything serially.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
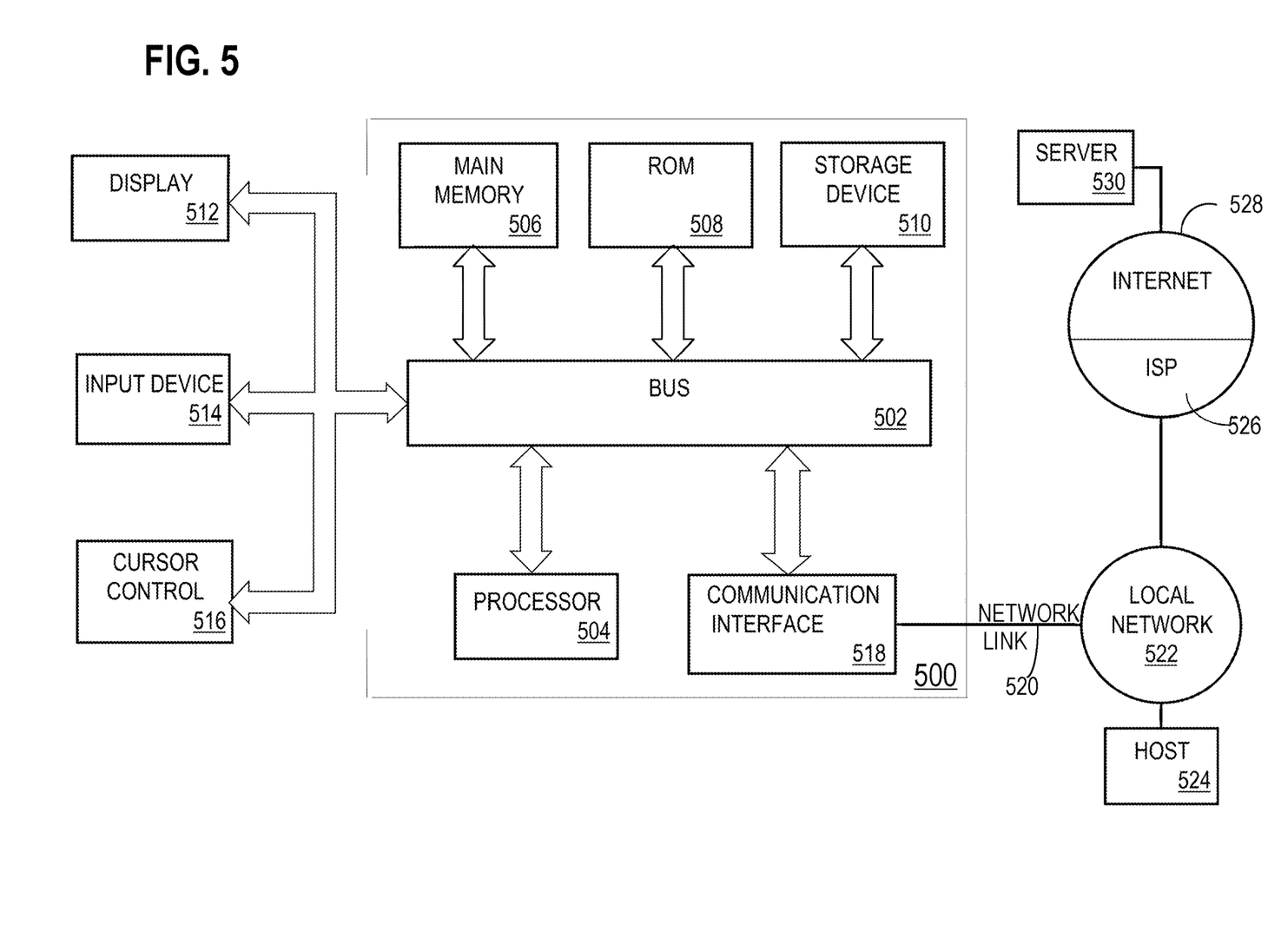
FIG. 5 is a block diagram of a computer system that may be used to execute the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    maintaining a task queue that includes a plurality of entries, wherein each entry of the plurality of entries corresponds to a not-yet-executed task;
    wherein the task queue has a head and a tail;
    as resources become available to execute a task that is not currently being executed, executing the task that corresponds to the entry at the head of the task queue;
    when execution of a new task is requested, determining whether the new task is (a) to be executed in a queue-mode, or (b) to be executing in an immediate-mode;
    if the new task is to be executed in the queue-mode, then adding an entry for the new task to the tail of the task queue;
    if the new task is to be executed in the immediate-mode, then determining whether resources are available to immediately execute the new task;
        if resources are available to immediately execute the new task, then executing the new task without adding any entry for the task to the task queue; and
        if resources are not available to immediately execute the new task, then adding an entry for the new task to the tail of the task queue;
    wherein the task queue is a first task queue associated with a first execution pool;
    maintaining a second tasks queue associated with a second execution pool; and
    determining whether to assign tasks to the first execution pool or the second execution pool based on priority levels assigned to the tasks;
    wherein the method is performed by one or more computing devices.

2. The method of claim 1 wherein determining whether the new task is (a) to be executed in the queue-mode, or (b) to be executing in the immediate-mode comprises: determining whether the new task is a top-level task; and
    if the new task is a top-level task, determining that the new task is to be executed in the queue-mode; and
    if the new task is not a top-level task, determining that the new task is to be executed in the immediate-mode.

3. The method of claim 1 further comprising:
    upon failure of a particular task that had a first execution mode, assigning the task a second execution mode; and
    retrying execution of the particular task with the second execution mode.

4. The method of claim 3 wherein the first execution mode is the queue-mode, and the second execution mode is the immediate-mode.

5. The method of claim 1 wherein: tasks with a first priority level are assigned to the first execution pool; tasks with a second priority level are assigned to the second execution pool; the first priority level is lower than the second priority level; and
    more system resources are used to process the tasks assigned to the second execution pool than to process tasks assigned to the first execution pool.

6. The method of claim 5 further comprising:
    upon failure of a particular task that had the first priority level, assigning the task the second priority level; and
    retrying execution of the particular task with the second priority level.

7. The method of claim 5 further comprising allowing the tasks that correspond to records in the task queue to be changed after the records have been placed in the task queue and before that tasks are executed.

8. The method of claim 1 further comprising:
    when execution of a second new task is requested, determining that the second new task is to be executed in a no queue mode;
    responsive to determining that the second new task is to be executed in the no queue mode, executing the second new task without queuing the second new task if resources are available; and
    if resources are not available, executing the second new task without queuing the second new task as soon as the resources become available.

9. The method of claim 1 further comprising:
    when execution of a second new task is requested, determining that the second new task is to be executed in a delayed queuing mode;
    responsive to determining that the second new task is to be executed in the delayed queuing mode, waiting to queue the second new task until a specified amount of time has expired; and
    when the specified amount of time has expired, queuing the second new task in the task queue.

10. The method of claim 1 further comprising:
    when execution of a second new task is requested, determining that the second new task is to be executed in a delay mode;
    responsive to determining that the second new task is to be executed in the delay mode, queuing the second new task in the task queue; and
    when the second new task is at the head of the task queue, delaying execution of the second new task if a specified amount of time has not elapsed since creation of the second new task.

11. One or more non-transitory computer-readable media storing instructions which, when executed by one or more computing devices, cause:

maintaining a task queue that includes a plurality of entries, wherein each entry of the plurality of entries corresponds to a not-yet-executed task;

wherein the task queue has a head and a tail;

as resources become available to execute a task that is not currently being executed, executing the task that corresponds to the entry at the head of the task queue;

when execution of a new task is requested, determining whether the new task is (a) to be executed in a queue-mode, or (b) to be executing in an immediate-mode;

if the new task is to be executed in the queue-mode, then adding an entry for the new task to the tail of the task queue;

if the new task is to be executed in the immediate-mode, then determining whether resources are available to immediately execute the new task;

if resources are available to immediately execute the new task, then executing the new task without adding any entry for the task to the task queue; and if resources are not available to immediately execute the new task, then adding an entry for the new task to the tail of the task queue;

the task queue is a first task queue associated with a first execution pool;

maintaining a second tasks queue associated with a second execution pool; and determining whether to assign tasks to the first execution pool or the second execution pool based on priority levels assigned to the tasks.

12. The one or more non-transitory computer-readable media of claim 11 wherein determining whether the new task is (a) to be executed in the queue-mode, or (b) to be executing in the immediate-mode comprises: determining whether the new task is a top-level task; and if the new task is a top-level task, determining that the new task is to be executed in the queue-mode; and if the new task is not a top-level task, determining that the new task is to be executed in the immediate-mode.

13. The one or more non-transitory computer-readable media of claim 11 further comprising instructions for:

upon failure of a particular task that had a first execution mode, assigning the task a second execution mode; and retrying execution of the particular task with the second execution mode.

14. The one or more non-transitory computer-readable media of claim 13 wherein the first execution mode is the queue-mode, and the second execution mode is the immediate-mode.

15. The one or more non-transitory computer-readable media of claim 11 wherein:

tasks with a first priority level are assigned to the first execution pool;

tasks with a second priority level are assigned to the second execution pool; the first priority level is lower than the second priority level; and more system resources are used to process tasks assigned to the second execution pool than to process the tasks assigned to the first execution pool.

16. The one or more non-transitory computer-readable media of claim 15 further comprising instructions for:

upon failure of a particular task that had the first priority level, assigning the task the second priority level; and retrying execution of the particular task with the second priority level.

17. The one or more non-transitory computer-readable media of claim 15 further comprising instructions for allowing the tasks that correspond to records in the task queue to be changed after the records have been placed in the task queue and before that tasks are executed.

18. The one or more non-transitory computer-readable media of claim 11 further comprising instructions for:

when execution of a second new task is requested, determining that the second new task is to be executed in a no queue mode;

responsive to determining that the second new task is to be executed in the no queue mode, executing the second new task without queuing the second new task if resources are available; and if resources are not available, executing the second new task without queuing the second new task as soon as resources become available.

19. The one or more non-transitory computer-readable media of claim 11 further comprising instructions for:

when execution of a second new task is requested, determining that the second new task is to be executed in a delayed queuing mode;

responsive to determining that the second new task is to be executed in the delayed queuing mode, waiting to queue the second new task until a specified amount of time has expired; and when the specified amount of time has expired, queuing the second new task in the task queue.

20. The one or more non-transitory computer-readable media of claim 11 further comprising:

when execution of a second new task is requested, determining that the second new task is to be executed in a delay mode;

responsive to determining that the second new task is to be executed in the delay mode, queuing the second new task in the task queue; and when the second new task is at the head of the task queue, delaying execution of the second new task if a specified amount of time has not elapsed since creation of the second new task.

* * * * *